United States Patent
Smith et al.

(10) Patent No.: US 12,165,026 B1
(45) Date of Patent: Dec. 10, 2024

(54) APPARATUS AND METHOD FOR DETERMINING A PROJECTED OCCURRENCE

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/600,520

(22) Filed: Mar. 8, 2024

(51) Int. Cl.
*G06N 20/00* (2019.01)

(52) U.S. Cl.
CPC .................... *G06N 20/00* (2019.01)

(58) Field of Classification Search
CPC ....................................... G06N 20/00
See application file for complete search history.

(56) References Cited

U.S. PATENT DOCUMENTS

| | | | | |
|---|---|---|---|---|
| 11,868,860 B1 * | 1/2024 | Spannhake, II | ....... | G06N 20/00 |
| 11,948,065 B1 * | 4/2024 | Spannhake, II | ....... | G06N 3/088 |
| 2019/0286994 A1 | 9/2019 | Bhoj et al. | | |
| 2020/0397383 A1 * | 12/2020 | Genov | .................. | G16H 40/67 |
| 2021/0133688 A1 | 5/2021 | Park et al. | | |
| 2021/0279603 A1 | 9/2021 | Teran Matus et al. | | |
| 2023/0073643 A1 * | 3/2023 | Kommer | .................. | G06N 7/01 |
| 2023/0342727 A1 | 10/2023 | Varghese et al. | | |
| 2023/0353590 A1 * | 11/2023 | Hubbard | ............. | H04L 63/1408 |

* cited by examiner

*Primary Examiner* — Dave Misir
(74) *Attorney, Agent, or Firm* — Caldwell Intellectual Property Law

(57) ABSTRACT

Described herein is an apparatus and a method for determining a projected occurrence. An apparatus may include at least a processor; and a memory communicatively connected to the at least processor, the memory containing instructions configuring the at least processor to identify a series of nonadjacent occurrences within process data; determine a plurality of characteristic features corresponding to occurrences in the series of non-adjacent occurrences using a feature learning algorithm; generate a plurality of potential projected occurrences as a function of the plurality of characteristic features; weight the plurality of potential projected occurrences as a function of at least an optimization constraint in the process data; and select a projected occurrence as a function of the weighted plurality of potential projected occurrences.

16 Claims, 6 Drawing Sheets

APPARATUS AND METHOD FOR DETERMINING A PROJECTED OCCURRENCE

FIELD OF THE INVENTION

The present invention generally relates to the field of machine learning. In particular, the present invention is directed to an apparatus and method for determining a projected occurrence.

BACKGROUND

Currently, processes such as data collection, processing power allocation, manufacturing capacity, and the like are often allocated upon a need arising or upon a decision being made to allocate resources. In instances where such processes are done in advance, decisions on resource allocation often do not take full advantage of the data available. Data such as communication between humans is difficult to take into account in this context, at least in part due to the difficulty of converting human communication into a useful dataset.

SUMMARY OF THE DISCLOSURE

In an aspect, an apparatus for determining a projected occurrence may include at least a processor; and a memory communicatively connected to the at least processor, wherein the memory contains instructions configuring the at least processor to identify a series of nonadjacent occurrences within process data; determine a plurality of characteristic features corresponding to occurrences in the series of non-adjacent occurrences using a feature learning algorithm; generate a plurality of potential projected occurrences as a function of the plurality of characteristic features; weight each potential projected occurrence of the plurality of potential projected occurrences as a function of at least an optimization constraint in the process data; and select at least one projected occurrence as a function of the weighted plurality of potential projected occurrences.

In another aspect, a method of determining a projected occurrence may include using at least a processor, identifying a series of nonadjacent occurrences within process data; using at least a processor, determining a plurality of characteristic features corresponding to occurrences in the series of non-adjacent occurrences using a feature learning algorithm; using at least a processor, generating a plurality of potential projected occurrences as a function of the plurality of characteristic features; using at least a processor, weighting each potential projected occurrence of the plurality of potential projected occurrences as a function of at least an optimization constraint in the process data; and using at least a processor, selecting at least one projected occurrence as a function of the weighted plurality of potential projected occurrences.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for determining a projected occurrence. An apparatus may collect process data from sources such as a user device or a data store, and may determine a series of nonadjacent occurrences from process data. This may include, for example, determining which occurrences are associated from a larger data set. A feature learning algorithm may be used to determine characteristic features from such series. A machine learning model may then be used to determine one or more potential projected occurrences. A projected occurrence may be selected through use of an optimization algorithm. This process may aid in allocation of resources for tasks such as data collection, and tasks which require large amounts of computing power such as producing a proof of work in cryptography.

Figure 1:
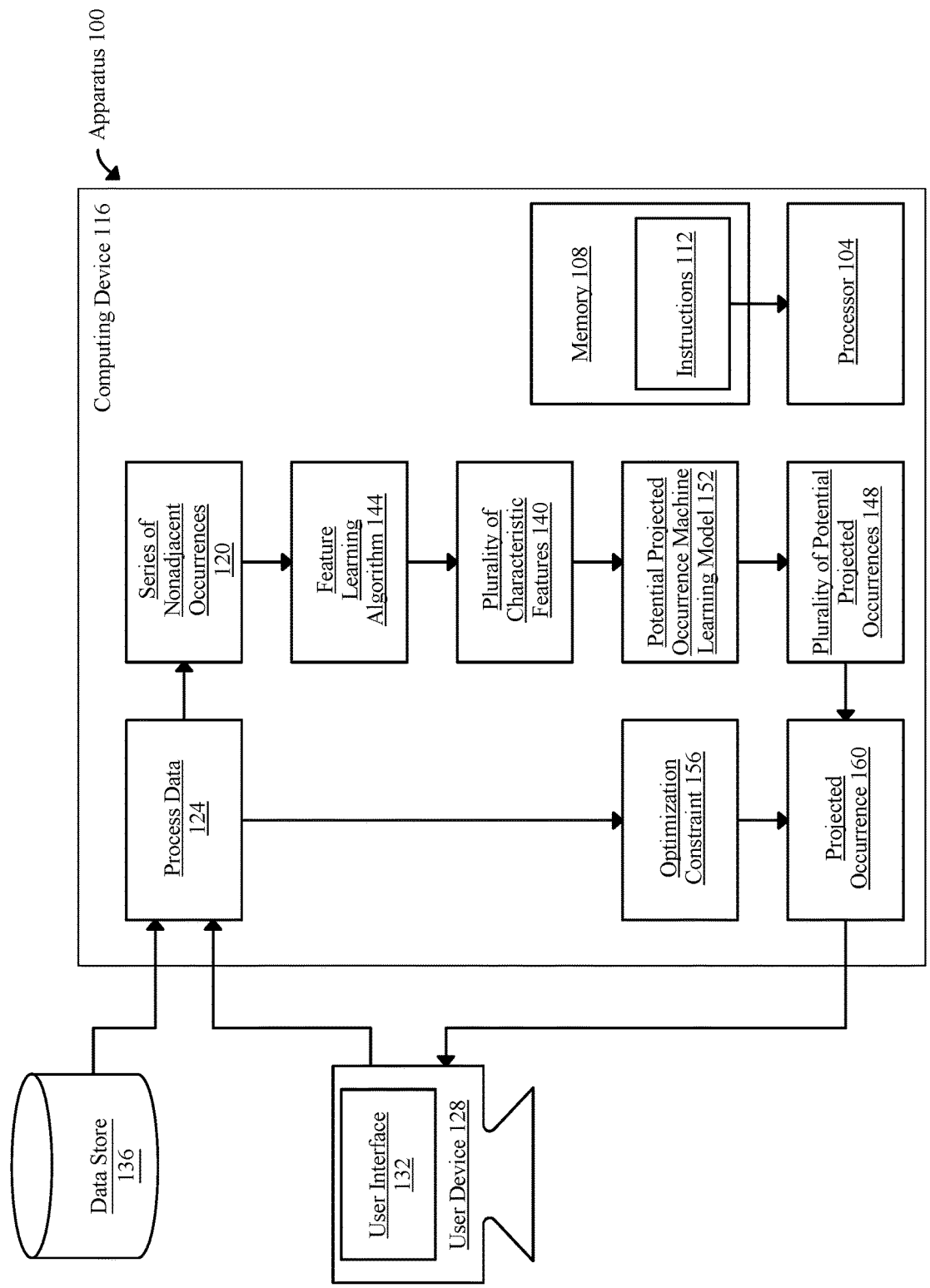
FIG. 1 is a diagram depicting an exemplary apparatus for determining a projected occurrence.

Referring now to FIG. 1, an exemplary embodiment of an apparatus 100 for determining a projected occurrence is illustrated. Apparatus 100 may include a computing device. Apparatus 100 may include a processor. Processor may include, without limitation, any processor described in this disclosure. Processor may be included in computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, apparatus 100 may include at least a processor 104 and a memory 108 communicatively connected to the at least a processor 104, the memory 108 containing instructions 112 configuring the at least a processor 104 to perform one or more processes described herein. Computing device 116 may include processor 104 and/or memory 108. Computing device 116 may be configured to perform one or more processes described herein.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 is configured to identify a series of nonadjacent occurrences 120 within process data 124. As used herein, a "series of nonadjacent occurrences" is a series of events where at least one event is not adjacent in time to any other event of the series of events. For example, a first event of a series of nonadjacent events may include a phone call, and a second event may include an in person meeting the next day. In another example, process data 124 may include data describing a plurality of historical events. In another example, process data 124 may include data describing a set of time series data. In another example, process data 124 may include a timeline including a plurality of nonadjacent occurrences arranged in a chronological order based on associated data describing a time and date at which such occurrences took place. In some embodiments, process data 124 may include data describing an amount of time between nonadjacent occurrences. As used herein, "process data" is information that is collected and used to manage one or more processes within a system. Such a system may include, in non-limiting examples, a company, organization, or other legal entity. For example, process data may include transcripts from a series of communications. In another example, process data may include status updates from multiple stages of designing a machine, software, or the like. In another example, process data may include data describing several sessions of a user interacting with a machine, software, or the like. Process data 124 may include data describing entities interacting with a particular process and/or carrying out a particular process.

Still referring to FIG. 1, in some embodiments, identifying series of nonadjacent occurrences 120 within process data 124 may include receiving process data 124. In some embodiments, process data 124 may be received from a user device 128. User device 128 may include, in non-limiting examples, a smartwatch, smartphone, a device for monitoring activity or fitness, a laptop computer, a desktop computer, a tablet, an augmented reality device, or a virtual reality device. For example, data on multiple user interactions with user device 128 may be recorded by user device 128 and transmitted to computing device 116. In some embodiments, user inputs into user interface 132 may indicate which process data should be gathered. For example, a user may indicate a particular email inbox to be monitored for process data 124. In another example, a user may indicate an external source of process data 124 to be gathered, such as data from a data store. User interface 132 may include a graphical user interface (GUI). User interface 132 may include a touch-screen GUI interface. User interface 132 may include a computing device configured to receive an input from a user. In some embodiments. an interface may be configured to prompt a user for an input. User interface 132 may include an input interface, such as a mouse, keyboard, touchscreen, button, lever, scroll wheel, microphone, controller, joystick, or the like. User interface 132 may include an output interface, such as a screen, speaker, haptic feedback system, or the like.

Still referring to FIG. 1, in some embodiments, process data 124 may be received from data store 136. In a non-limiting example, processor 104 may request process data 124 from data store 136 using an application programming interface (API), and processor 104 may receive from the database, or a computing device associated with the database, process data 124. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, process data 124 may be received from several user devices. For example, user devices on which particular software is installed may transmit to computing device 116 process data 124 describing user interactions with such software. In another example, data describing user devices which interact with a particular website may be recorded and/or transmitted to computing device 116. Such a communication may be done by a user device, a computing device associated with such a website, or both. In another example, data describing use of user devices made by a particular manufacturer, and/or including a particular part may be transmitted to computing device 116.

Still referring to FIG. 1, in some embodiments, process data 124 may include communications between multiple entities. As used herein, an "entity" is a person, a computing device, an organization, another system which may make communications or which communications may be made on behalf of, or a combination of these. Such communications may include text based communications, such as text messages, emails, text sent using a messaging app, or the like. Such communications may include voice based communications, such as phone calls, in person spoken communications, and the like. Voice communications may be recorded using a microphone.

Still referring to FIG. 1, in some embodiments, identifying series of nonadjacent occurrences 120 within process data 124 may include interpreting process data 124 using a language model. In a non-limiting example, process data 124 may include many emails, and a language model may be used to interpret individual emails. In another non-limiting example, a spoken conversation, such as a phone call or an in person conversation, may be recorded using a microphone and transcribed using an automatic speech recognition process, and the transcription may be input into a language model. In some embodiments, language model interpretation may be used for grouping of process data 124 to determine series of nonadjacent occurrences 120 from a larger set of data. In some embodiments, a meaning of language as interpreted by a language model may be included in data within series of nonadjacent occurrences 120.

Still referring to FIG. 1, in some embodiments, a language model may be used to process and/or interpret process data 124. As used herein, a "language model" is a program capable of interpreting natural language, generating natural language, or both. In some embodiments, a language model may be configured to interpret the output of an automatic speech recognition function and/or an OCR function. A language model may include a neural network. A language model may be trained using a dataset that includes natural language.

Still referring to FIG. 1, generating language model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, processor 104 may determine one or more language elements in process data 124 by identifying and/or detecting associations between one or more language elements (including phonemes or phonological elements, morphemes or morphological elements, syntax or syntactic elements, semantics or semantic elements, and pragmatic elements) extracted from at least user data and/or response, including without limitation mathematical associations, between such words. Associations between language elements and relationships of such categories to other such term may include, without limitation, mathematical associations, including without limitation statistical correlations between any language element and any other language element and/or Language elements. Processor 104 may compare an input such as a sentence from process data 124 with a list of keywords or a dictionary to identify language elements. For example, processor 104 may identify whitespace and punctuation in a sentence and extract elements comprising a string of letters, numbers or characters occurring adjacent to the whitespace and punctuation. Processor 104 may then compare each of these with a list of keywords or a dictionary. Based on the determined keywords or meanings associated with each of the strings, processor 104 may determine an association between one or more of the extracted strings and a feature of an occurrence, such as an association between a message containing the words "disappointing" and "efficacy" and poor results in an experiment to determine the efficacy of a drug. Associations may take the form of statistical correlations and/or mathematical associations, which may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory.

Still referring to FIG. 1, processor 104 may be configured to determine one or more language elements in process data 124 using machine learning. For example, processor 104 may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input language elements and output patterns or conversational styles in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word, phrase, and/or other semantic unit. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Still referring to FIG. 1, processor 104 may be configured to determine one or more language elements in process data 124 using machine learning by first creating or receiving language classification training data. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 1, language classification training data may be a training data set containing associations between language element inputs and associated language element outputs. Language element inputs and outputs may be categorized by communication form such as written language elements, spoken language elements, typed language elements, or language elements communicated in any suitable manner. Language elements may be categorized by component type, such as phonemes or phonological elements, morphemes or morphological elements, syntax or syntactic elements, semantics or semantic elements, and pragmatic elements. Associations may be made between similar communication types of language elements (e.g. associating one written language element with another written language element) or different language elements (e.g. associating a spoken language element with a written representation of the same language element). Associations may be identified between similar communication types of two different language elements, for example written input consisting of the syntactic element "that" may be associated with written phonemes /th/, /ă/, and /t/. Associations may be identified between different communication forms of different language elements. For example, the spoken form of the syntactic element "that" and the associated written phonemes above. Language classification training data may be created using a classifier such as a language classifier. An exemplary classifier may be created, instantiated, and/or run using processor 104, or another computing device. Language classification training data may create associations between any type of language element in any format and other type of language element in any format. Additionally, or alternatively, language classification training data may associate language element input data to a feature related to an occurrence. For example, language classification training data may associate occurrences of the syntactic elements "system," and "crashed," in a single sentence with a computing device crashing.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail belowi a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, in some embodiments, a datum such as process data 124 may be converted into a different form. Data formats may be converted in a variety of ways, such as without limitation, using a speech to text function or using optical character recognition. In some embodiments, a datum such as process data 124 may be converted into a different form such that it is in a form appropriate for input into a function. As a non-limiting example, a language model may only accept inputs in a particular format, and process data 124 may be converted into that format such that it may be effectively input into the language model.

Still referring to FIG. 1, data may also be altered such that it retains the same format but is more likely to produce successful or relevant results. As a non-limiting example, a machine learning model may be used to replace obscure words in a text file with more common words that have similar or identical meanings. In this example, this may be done by training a machine learning model on samples of text using unsupervised learning such that the machine learning model learns associations between words (such as based on how frequently they are used together). In this example, words may be represented as vectors with dimensions indicating their relationship to other words, and whether words are synonyms may be determined based on how similar their vectors are (as in, if vectors representing 2 words point in the same direction, those words may be synonyms). In this example, a first word determined to be similar to or a synonym of a second word, may be replaced by the second word.

Still referring to FIG. 1, in some embodiments, process data 124 may be processed using automatic speech recognition. In some embodiments, automatic speech recognition may require training (i.e., enrollment). In some cases, training an automatic speech recognition model may require an individual speaker to read text or isolated vocabulary. In some cases, training data may include an audio component having an audible verbal content, the contents of which are known a priori by a computing device. Computing device may then train an automatic speech recognition model according to training data which includes audible verbal content correlated to known content. In this way, computing device may analyze a person's specific voice and train an automatic speech recognition model to the person's speech, resulting in increased accuracy. Alternatively, or additionally, in some cases, computing device may include an automatic speech recognition model that is speaker independent. As used in this disclosure, a "speaker independent" automatic speech recognition process is an automatic speech recognition process that does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" is a process of identifying a speaker, from audio content, rather than what the speaker is saying. In some cases, computing device may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within process data 124, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics-indeed, any data that can be turned into a linear representation can be analyzed with DTW. In some cases, DTW may be used by an automatic speech recognition process to cope with different speaking (i.e., audible verbal content) speeds. In some cases, DTW may allow computing device to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 2-4. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, in some embodiments, apparatus 100 may identify series of nonadjacent occurrences 120 from a larger set of process data 124. Several methods may be used to identify series of nonadjacent occurrences 120. For example, data associated with a particular user, a particular device, or the like may be grouped to form series of nonadjacent occurrences 120. This may include data on a particular device interacting with a particular website multiple times, data on multiple communications with the same individual, or the like. In some embodiments, multiple instances of communication between the same individuals or entities occur over different communication channels, and they may be grouped into a single series of nonadjacent occurrences 120. For example, a first communication between the same individuals may include email, a second communication may include a phone call, and a third communication may include a video call, and each of these communications may be grouped into a series of nonadjacent occurrences 120. In another example, multiple communications involving different representatives of the same entity may be grouped. In another example, the meaning of a communication may be used to group process data 124 into series of nonadjacent occurrences 120. For example, a user may receive an update from a first person and seek advice on the matter from a second person, and a language model may determine that they are part of the same group based on the similarity of the topics discussed. In another example, series of nonadjacent occurrences 120 may be identified by a user and/or a user may input rules for identifying series of nonadjacent occurrences 120. In another example, series of nonadjacent occurrences 120 may be identified based on repetition. For example, series of nonadjacent occurrences 120 may include multiple instances of the same set of data, such as numbers of users using a particular software daily over a year.

Still referring to FIG. 1, in some embodiments, apparatus 100 is configured to determine a plurality of characteristic features 140 corresponding to occurrences in series of nonadjacent occurrences 120. As used herein, a "characteristic feature" is a grouping of an occurrence, a series of nonadjacent occurrences, or both, into a category. For example, several occurrences may be grouped based on a degree of similarity of a language model output based on transcripts of the occurrences. In another example, occurrences may be grouped based on similarities between status updates in design of a machine, software, or the like. Elements of data such as metrics used to identify a status of a project, and language model interpretations of communications regarding project status, may be included. In another example, occurrences may be grouped based on similarities between user interactions with a particular machine, software, or the like. For example, apparatus 100 may use an algorithm described below to identify multiple users as engaging in similar use patterns.

Still referring to FIG. 1, apparatus 100 may determine a plurality of characteristic features 140 using feature learning algorithm 144. A feature learning algorithm may include an unsupervised machine learning model. In some embodiments, apparatus 100 may generate an unsupervised machine learning model as a function of the feature learning algorithm; and determine the plurality of characteristic features using the unsupervised machine learning model. In some embodiments, a feature learning algorithm may include K-means clustering. In some embodiments, feature learning algorithm 144 may be used to identify a cluster to which an occurrence and/or a series of nonadjacent occurrences 120 belongs. In some embodiments, feature learning algorithm 144 may be used to classify an occurrence and/or a series of nonadjacent occurrences 120, such as by classifying an occurrence as belonging to a particular cluster.

Still referring to FIG. 1, "feature learning algorithm," as used herein, is a machine-learning algorithm that identifies associations between elements of data in a data set where particular inputs, particular outputs, or both are not specified. Such a data set may include, in a non-limiting example, a training data set. For instance, and without limitation, a feature learning algorithm may detect co-occurrences of sets of individual occurrences and/or series of nonadjacent occurrences 120, with each other. Computing device may perform a feature learning algorithm by dividing occurrences of series of nonadjacent occurrences 120 from a given individual, entity, or the like into various sub-combinations of such data to create occurrences of series of nonadjacent occurrences 120 sets, and evaluate which occurrences of series of nonadjacent occurrences 120 sets tend to co-occur with which other occurrences of series of nonadjacent occurrences 120 sets; for instance, computing device may divide each set of occurrences into individual occurrences and evaluate which individual occurrences and/or combinations thereof tend to co-occur with which other individual occurrences, and/or other occurrences of series of nonadjacent occurrences 120. In an embodiment, first feature learning algorithm may perform clustering of data.

Still referring to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

Still referring to FIG. 1, computing device may generate a k-means clustering algorithm receiving unclassified occurrences of series of nonadjacent occurrences 120 and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related occurrences of series of nonadjacent occurrences 120, which may be provided with user cohort labels; this may, for instance, generate an initial set of user cohort labels from an initial set of occurrences of series of nonadjacent occurrences 120 of a large number of users, and may also, upon subsequent iterations, identify new clusters to be provided new user cohort labels, to which additional occurrences of series of nonadjacent occurrences 120 may be classified, or to which previously used occurrences of series of nonadjacent occurrences 120 may be reclassified.

Still referring to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $argmin_{c_i \ni C} dist(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected occurrences of series of nonadjacent occurrences 120 set. Degree of similarity index value may indicate how close a particular combination of occurrences is to being classified by k-means algorithm to a particular cluster. K-means clustering algorithm may evaluate the distances of the combination of occurrences to the k-number of clusters output by k-means clustering algorithm. Short distances between a set of occurrences of series of nonadjacent occurrences 120 and a cluster may indicate a higher degree of similarity between the set of occurrences of series of nonadjacent occurrences 120 and a particular cluster. Longer distances between a set of occurrences and a cluster may indicate a lower degree of similarity between occurrences of series of nonadjacent occurrences 120 set and a particular cluster.

Still referring to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between occurrences of series of nonadjacent occurrences 120 set and the data entry cluster. Alternatively, or additionally k-means clustering algorithm may select a plurality of clusters having low degree of similarity index values to occurrences of series of nonadjacent occurrences 120 sets, indicative of greater degrees of similarity. Degree of similarity index values may be compared to a threshold number indicating a minimal degree of relatedness suitable for inclusion of a set of occurrences of series of nonadjacent occurrences 120 in a cluster, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; persons skilled in the art, upon reviewing the entirety of this disclosure, will be aware of various additional or alternative feature learning approaches that may be used consistently with this disclosure.

Still referring to FIG. 1, in some embodiments, feature learning algorithm 144 may use a tensor such as a matrix as an input. For example, a matrix may include columns for time, event type, event participants, medium of communication, and/or other variables, and a feature learning algorithm may use as inputs rows of data from such a matrix. In another example, tensor clustering, such as biclustering, may be used.

Still referring to FIG. 1, in some embodiments, selection of feature learning algorithm 144 and/or implementation of feature learning algorithm 144 may be optimized. For example, in some embodiments, a k-means clustering algorithm may produce suboptimal results when an incorrect number of centroids is selected, when data clusters are not isotropically distributed, when data clusters do not have equal variance, and/or when data clusters do not contain equal numbers of data points. In some embodiments, feature learning algorithm 144 may be applied multiple times, using different parameters, such as differing numbers of centroids in a k-means clustering algorithm. In some embodiments, a transformation may be applied to data to produce more isotropically distributed clusters.

Still referring to FIG. 1, in some embodiments, a neural network may be used for feature learning. For example, an unsupervised neural network may be used to cluster occurrences and/or series of nonadjacent occurrences 120.

Still referring to FIG. 1, in some embodiments, apparatus 100 is configured to generate a plurality of potential projected occurrences 148 as a function of plurality of characteristic features 140. As used herein, a "projected occurrence" is an event which may occur in the future, an assessment of such an event, outcome of such an event, or combinations thereof. Such an assessment may include, in non-limiting examples, an assessment of a likelihood of a projected occurrence, and/or a desirability of a projected occurrence. In an example, series of nonadjacent occurrences 120 may include updates on aspects or stages of software development, and plurality of potential projected occurrences 148 may include several potential scenarios as to the number of daily users of the software in 6 months, such as a first scenario in which it decreases by roughly 50%, a second scenario in which it stays roughly the same, and a third scenario in which it increases by roughly 50%. In another example, series of nonadjacent occurrences 120 may include a series of communications between individuals discussing starting a project which would require a particular dataset. In this example, plurality of potential projected occurrences 148 may include potential scenarios on whether or not the individuals move forward with the project. In another example, series of nonadjacent occurrences 120 may include data describing several instances of users interacting with a particular piece of software. In this example, plurality of potential projected occurrences 148 may include potential scenarios on the number of users that will be using the software at a later date, or potential scenarios on the tools within the software that such users will be using or will desire at a later date.

Still referring to FIG. 1, in some embodiments, apparatus 100 may generate plurality of potential projected occurrences 148 using potential projected occurrence machine learning model 152. Potential projected occurrence machine learning model 152 may include a machine learning model trained using supervised learning. Potential projected occurrence machine learning model 152 may include a classifier. Potential projected occurrence machine learning model 152 may include a regression model. Potential projected occurrence machine learning model 152 may be trained on a training dataset including example characteristic features, associated with example projected occurrences. For example, a training dataset may include clusters to which historical communications are assigned, associated with relevant events that took place after those historical communications. For example, an element of training data may include a cluster associated with a report indicating the status of a project or a language model interpretation of such report, and this cluster may be associated with an outcome of the project. In another example, a training dataset may include a cluster associated with historical data on how users use particular software, associated with the number of users using that software at a later date, the degree to which such number changed, or the like. Once potential projected occurrence machine learning model 152 is trained, it may be used to determine plurality of potential projected occurrences 148. One or more characteristic feature of plurality of characteristic features 140 may be input into potential projected occurrence machine learning model 152, and one or more potential projected occurrence of plurality of potential projected occurrences 148 may be received from potential projected occurrence machine learning model 152 as an output. In some embodiments, multiple characteristic features may be input into potential projected occurrence machine learning model 152 separately in order to produce multiple outputs, which may make up plurality of potential projected occurrences 148. In some embodiments, different combinations of characteristic features may be input into potential projected occurrence machine learning model 152 separately in order to produce multiple outputs, which may make up plurality of potential projected occurrences 148. In some embodiments, characteristic features of different series of nonadjacent occurrences 120 may be input into potential projected occurrence machine learning model 152 separately in order to produce multiple outputs, which may make up plurality of potential projected occurrences 148. For example, several communications or other elements of process data 124 may be predictive of one or more events, distinct series of nonadjacent occurrences 120 may be determined based on these, as described above, and distinct potential projected occurrences may be determined from characteristic features associated with such series of nonadjacent occurrences 120.

Still referring to FIG. 1, in some embodiments, apparatus 100 is configured to weight one or more potential projected occurrence of plurality of potential projected occurrences 148 as a function of at least an optimization constraint 156. For example, each potential projected occurrence of potential projected occurrences 148 may be weighted. Optimization constraint 156 may be in or derived from process data 124. Plurality of potential projected occurrences 148 may be weighted based on an optimization algorithm. An optimization algorithm may include a selection of a best element from a plurality of alternatives. For example, an optimization algorithm may include an algorithm for finding a maximum or minimum evaluation of a particular function. Such function may be known as an objective function. As an example, an optimization algorithm may find a potential projected occurrence of plurality of potential projected occurrences 148 with a maximum likelihood of occurring. Variables and/or solutions of an objective function may be discrete or continuous. An optimization algorithm may take into account one or more optimization criteria and/or one or more optimization constraints 156. As used herein, an "optimization constraint" is a limit on the values a variable in an objective function can take. For example, an objective function may describe the probability of potential projected occurrences of plurality of potential projected occurrences 148. In this example, optimization constraint 156 may include a limit on objective function variables. For example, an objective function may be limited such that the only potential outcomes are potential projected occurrences of plurality of potential projected occurrences 148. In another example, a probability estimate may be limited to a probability range of 0% to 100%. In some embodiments, an objective function may be predefined. For example, apparatus 100 may select from a list of predefined objective functions based on one or more of plurality of characteristic features 140.

Still referring to FIG. 1, in some embodiments, optimization constraint 156 may be included in and/or may be derived from process data 124. Optimization constraint 156 may be included in and/or derived from a datum determined from process data 124, such as series of nonadjacent occurrences 120, plurality of characteristic features 140, and/or plurality of potential projected occurrences 148. For example, series of nonadjacent occurrences 120 may include a series of communications between individuals, and optimization constraint 156 used to evaluate an associated potential projected occurrence may include a minimum and/or a maximum probability based on a cluster to which series of nonadjacent occurrences 120 was assigned by feature learning algorithm 144 (as in, a characteristic feature 140). Optimization constraint 156 may be based on probability of occurrence of a potential projected occurrence based on characteristic features 140 of associated series of nonadjacent occurrences. For example, an occurrence within series of nonadjacent occurrences 120 may indicate that use of a particular software has grown by 40% in the past year, and this may be grouped by feature learning algorithm 144 to a group including several occurrences in which there was growth in software use. In this example, an associated potential projected occurrence may include an occurrence in which use of the software grows by 70% in the next year, and associated optimization constraint 156 may be based on a rate of historical occurrences in the group reaching that level of growth. In another example, optimization constraint 156 may be based on process data related to an entity associated with series of nonadjacent occurrences 120. For example, an entity associated with series of nonadjacent occurrences 120 may have a certain rate of approval of a drug by a government agency, an associated potential projected occurrence may include an occurrence in which a particular drug is approved, and optimization constraint 156 may include a constraint on an estimated approval probability based on approval rate of the associated entity. In another example, optimization constraint 156 may be determined based on a confidence with which potential projected occurrence machine learning model 152 predicts a potential projected occurrence. For example, potential projected occurrence machine learning model 152 may output a degree with which input data is associated with categorical output data, and this degree of association may be used to determine optimization constraint 156. For example, if input data is highly associated with categorical output data, then optimization constraint 156 may reflect a high probability of occurrence, whereas optimization constraint 156 may reflect a lower probability of occurrence in a situation in which input data is less associated with categorical output data. In another example, optimization constraint 156 may include a condition on a non-probability variable, such as a variable describing whether a potential projected occurrence is likely to require use of a particular resource as described below.

Still referring to FIG. 1, optimization may include computing a score associated with each potential projected occurrence and selecting a potential projected occurrence to minimize and/or maximize the score, depending on whether an optimal result is represented, respectively, by a minimal and/or maximal score. A mathematical function, described herein as an objective function, may be used by apparatus 100 to score each possible pairing. Objective function may be based on one or more objectives as described below. In some embodiments, a score of a particular potential projected occurrence may be based on a combination of one or more factors, such as language model output, associated entities, overall rates of particular outcomes occurring, rates of particular outcomes occurring where certain characteristic features are present, and the like. Each factor may be assigned a score based on predetermined variables. In some embodiments, assigned scores may be weighted or unweighted.

Still referring to FIG. 1, optimization of an objective function may include performing a greedy algorithm process. As used herein, a "greedy algorithm" is an algorithm that selects locally optimal choices. Greedy algorithms may or may not generate a globally optimal solution. For instance, processor 104 may select potential projected occurrence so that scores associated therewith are the best score for each potential projected occurrence.

Still referring to FIG. 1, an objective function may be formulated as a linear objective function. Apparatus 100 may solve a linear objective function using a linear program such as without limitation a mixed-integer program. As used herein, a "linear program," is a program that optimizes a linear objective function, given at least a constraint. In some embodiments, apparatus 100 may determine potential projected occurrence that maximizes a total score subject to a constraint that a particular resource be allocated based on the outcome, as described below. A mathematical solver may be implemented to solve for values that maximize scores; mathematical solver may be implemented on apparatus 100, and/or may be implemented on third-party solver.

Still referring to FIG. 1, optimizing objective function may include minimizing a loss function, where a "loss function" is an expression an output of which an optimization algorithm minimizes to generate an optimal result. As a non-limiting example, apparatus 100 may assign variables relating to a set of parameters, which may correspond to score components as described above, calculate an output of mathematical expression using the variables, and select potential projected occurrence that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Still referring to FIG. 1, in some embodiments, particle swarm optimization (PSO) may be used. Particle swarm optimization may be used to, for example, find the minimum or maximum of a function. In particle swarm optimization, several particles are placed, such as by placing them randomly. Particles are then iteratively modified according to the best position of the particle in question, and the best position of all particles. Across several iterations, particles may converge on a global minimum/maximum and/or one or more local minima/maxima. The best position ever reached by a particle may be selected as a solution. In some embodiments, particle swarm optimization is less computationally expensive than, for example, computing the value of a function at each possible point.

Still referring to FIG. 1, in some embodiments, PSO may be used to determine a weight of an occurrence. For example, potential projected occurrences may represent points whose probability may be evaluated using an objective function. In some embodiments, a sufficiently high number of potential projected occurrences may be identified such that it may be computationally more efficient to use PSO to identify a minimum or maximum probability rather than, for example, evaluating the value of each potential projected occurrence. In some embodiments, PSO may be used to identify a global and/or local maximum probability of occurrence of one or more potential projected occurrences, and the probability of such potential projected occurrences may be used as their weight.

Still referring to FIG. 1, in some embodiments, apparatus 100 is configured to select a projected occurrence 160 as a function of weighted plurality of potential projected occurrences. In some embodiments, a potential projected occurrence with the highest weight may be selected. In some embodiments, multiple potential projected occurrences with the highest weight may be selected. In some embodiments, a potential projected occurrence may be selected based on an urgency with which such potential projected occurrence would require resources, which specific resources would be required, and/or the amount of resources which would be required, as described below. Weight may represent, in non-limiting examples, probability of occurrence or desirability.

Still referring to FIG. 1, in some embodiments, apparatus 100 may allocate a resource as a function of projected occurrence 160. For example, projected occurrence 160 may present a scenario in which utilization of a particular resource may be desirable. In some cases, such resource may be difficult to efficiently provide upon projected occurrence 160 happening but may be more readily available beforehand. Non-limiting examples of such resources may include computing power, data, and hardware time. For example, projected occurrence 160 may present a scenario in which a trained machine learning model is desirable. In this example, apparatus 100 may collect training data, and/or run a machine learning model training step in anticipation of projected occurrence 160. In another example, projected occurrence 160 may present a scenario in which utilization of a particular element of software grows rapidly. In this example, apparatus 100 may transmit such software to additional servers in order to increase available download bandwidth in anticipation of such increase in use. In another scenario, projected occurrence 160 may present a scenario in which use of a particular hardware item grows rapidly. In this example, apparatus 100 may allocate manufacturing resources for at least a part of such hardware item in advance. In some embodiments, apparatus 100 may gather a datum as a function of projected occurrence 100. In some embodiments, apparatus 100 may schedule a calculation as a function of projected occurrence 100. Such calculations may include, in non-limiting examples, determining a hash and/or proof of work in a cryptography setting, and training a machine learning model. In some embodiments, apparatus 100 may train a machine learning model as a function of projected occurrence 100. This may include retraining a machine learning model, such as potential projected occurrence machine learning model 152, using a new dataset, such as a new dataset including more recent data. This may include obtaining a new training dataset including a plurality of example characteristic features as inputs correlated to a plurality of example potential projected occurrences as outputs; and retraining the potential projected occurrence machine learning model using the new training dataset. In some embodiments, apparatus 100 may initiate a physical process such as manufacturing of an item as a function of projected occurrence 100. In some embodiments, apparatus 100 may transmit a signal to another device, such as a signal configuring the device to respond to requests for downloading a particular software as a function of projected occurrence 100.

Still referring to FIG. 1, in some embodiments, apparatus 100 may communicate a datum described herein to a user. In some embodiments, apparatus 100 may transmit a signal including a datum described herein to user device 128, and the signal may configure user device 128 to communicate such datum to user. Apparatus 100 may determine a visual element data structure based on a datum described herein. Visual element data structure may configure user device 128 to display a visual element. A visual element may display to a user a datum described herein.

Still referring to FIG. 1, in some embodiments, a visual element data structure may include a visual element. As used herein, a "visual element" is a datum that is displayed visually to a user. In some embodiments, a visual element data structure may include a rule for displaying visual element. In some embodiments, a visual element data structure may be determined as a function of projected occurrence 160. In some embodiments, a visual element data structure may be determined as a function of an item from the list consisting of process data 124, one or more occurrences of series of nonadjacent occurrences 120, feature learning algorithm 144, one or more characteristic features of plurality of characteristic features 140, potential projected occurrence machine learning model 152, one or more potential projected occurrence of plurality of potential projected occurrences 148, optimization constraint 156, and projected occurrence 160. In a non-limiting example, a visual element data structure may be generated such that visual element describing or highlighting projected occurrence 160 is displayed to a user. For example, visual elements may be used to display series of nonadjacent occurrences 120 associated with projected occurrence 160.

Still referring to FIG. 1, in some embodiments, visual element may include one or more elements of text, images, shapes, charts, particle effects, interactable features, and the like. For example, upon selection of a first visual element displaying series of nonadjacent occurrences 120 by a user, a second visual element highlighting an associated characteristic feature may be displayed. In another example, a visual element may include a table including columns for at least an occurrence of series of nonadjacent occurrences 120, at least a characteristic feature of plurality of characteristic features 140, projected occurrence 160, and/or an action to be taken based on projected occurrence 160.

Still referring to FIG. 1, a visual element data structure may include rules governing if or when visual element is displayed. In a non-limiting example, a visual element data structure may include a rule causing a visual element describing projected occurrence 160 to be displayed when a user selects projected occurrence 160 using a GUI.

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously.

Still referring to FIG. 1, a visual element data structure rule may apply to a single visual element or datum, or to more than one visual element or datum. A visual element data structure may categorize data into one or more categories and may apply a rule to all data in a category, to all data in an intersection of categories, or all data in a subsection of a category (such as all data in a first category and not in a second category). For example, the same rules may be applied to all visual elements for displaying potential projected occurrences. A visual element data structure may rank data or assign numerical values to them. This may include ranking data by priority. A numerical value may, for example, measure the degree to which a first datum is associated with a category or with a second datum. A visual element data structure may apply rules based on a comparison between a ranking or numerical value and a threshold. For example, a numerical value may rank visual elements based on relevance to a user search, and rules may be applied based on such numerical value. Rankings, numerical values, categories, and the like may be used to set visual element data structure rules. Similarly, rankings, numerical values, categories, and the like may be applied to visual elements, and visual elements may be applied based on them.

Still referring to FIG. 1, in some embodiments, visual element may be interacted with. For example, visual element may include an interface, such as a button or menu. In some embodiments, visual element may be interacted with using a user device such as a smartphone.

Still referring to FIG. 1, in some embodiments, apparatus 100 may transmit visual element data structure to user device 128. In some embodiments, visual element data structure may configure user device 128 to display visual element. In some embodiments, visual element data structure may cause an event handler to be triggered in an application of user device 128 such as a web browser. In some embodiments, triggering of an event handler may cause a change in an application of user device 128 such as display of visual element.

Still referring to FIG. 1, in some embodiments, apparatus 100 may transmit visual element to a display. A display may communicate visual element to user. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user to input data into the display. Interactive elements may be configured to enable interaction between a user and a computing device. In some embodiments, a visual element data structure is determined as a function of data input by user into a display.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, a series of nonadjacent occurrences data structure may include an int value representing the number of occurrences in the series. In some embodiments, data in a data structure may be organized in a linked list, tree, array, matrix, tenser, and the like. In a non-limiting example, process data 124 may be organized in a tabular data structure. In another non-limiting example, series of nonadjacent occurrences 120 may be organized in a tensor, such as a tensor in which a first dimension represents a timeline and/or various time points and another dimension contains values of variables at those time points, such as event type, event participants, or other attributes. For example, a 2 dimensional tensor such as a matrix may include columns for time, event type, event participants, medium of communication, and/or other variables. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date. A data structure may be stored in, for example, memory 108 or a database. Databases are described above.

Still referring to FIG. 1, in some embodiments, a data structure may be read and/or manipulated by processor 104. In a non-limiting example, a series of nonadjacent occurrences data structure may input into feature learning algorithm 144.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

Figure 2:
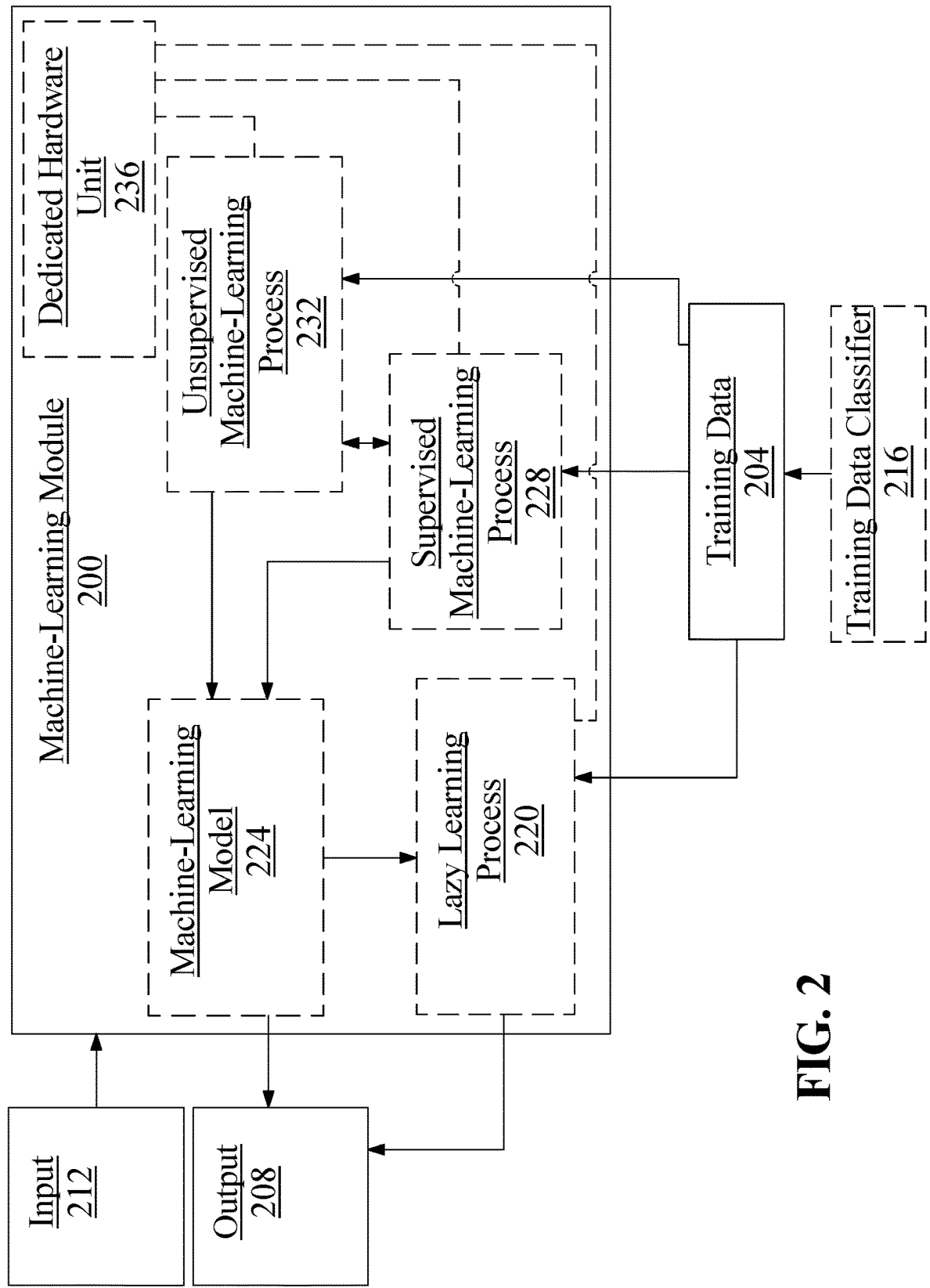
FIG. 2 is a box diagram of an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, inputs may include characteristic features and outputs may include potential projected occurrences.

Further referring to FIG. 2, training data may be filtered, sorted, and/or selected using one or more supervised and/or unsupervised machine-learning processes and/or models as described in further detail belowi such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to associated sequences of occurrences.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include characteristic features as described above as inputs, projected occurrences as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

With continued reference to FIG. 2, apparatus 100 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 2, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons and used as described above. Accuracy score or another score as described above may indicate a degree of retraining needed for a machine-learning model such as a classifier; apparatus 100 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Figure 3:
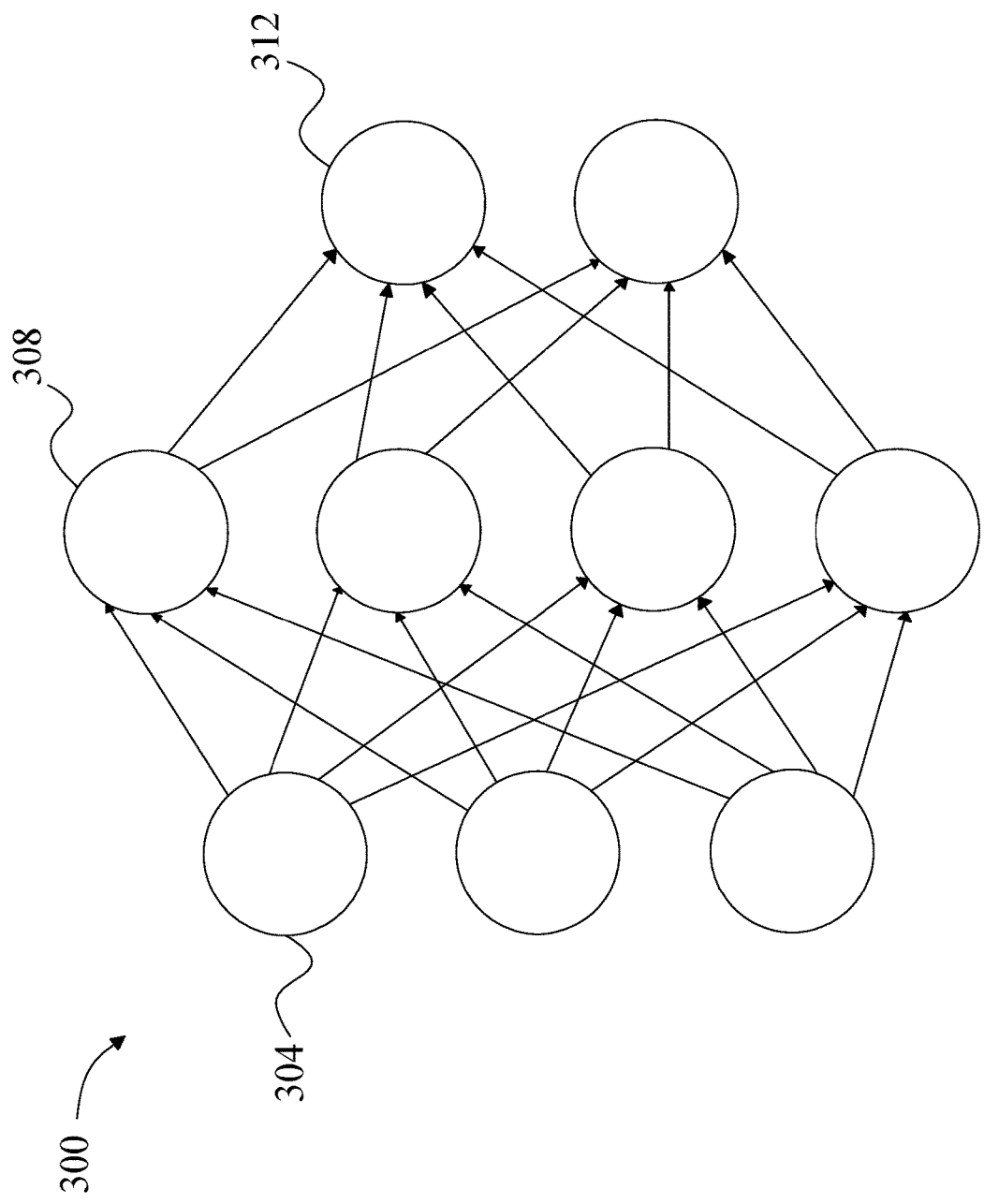
FIG. 3 is a diagram of an exemplary neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
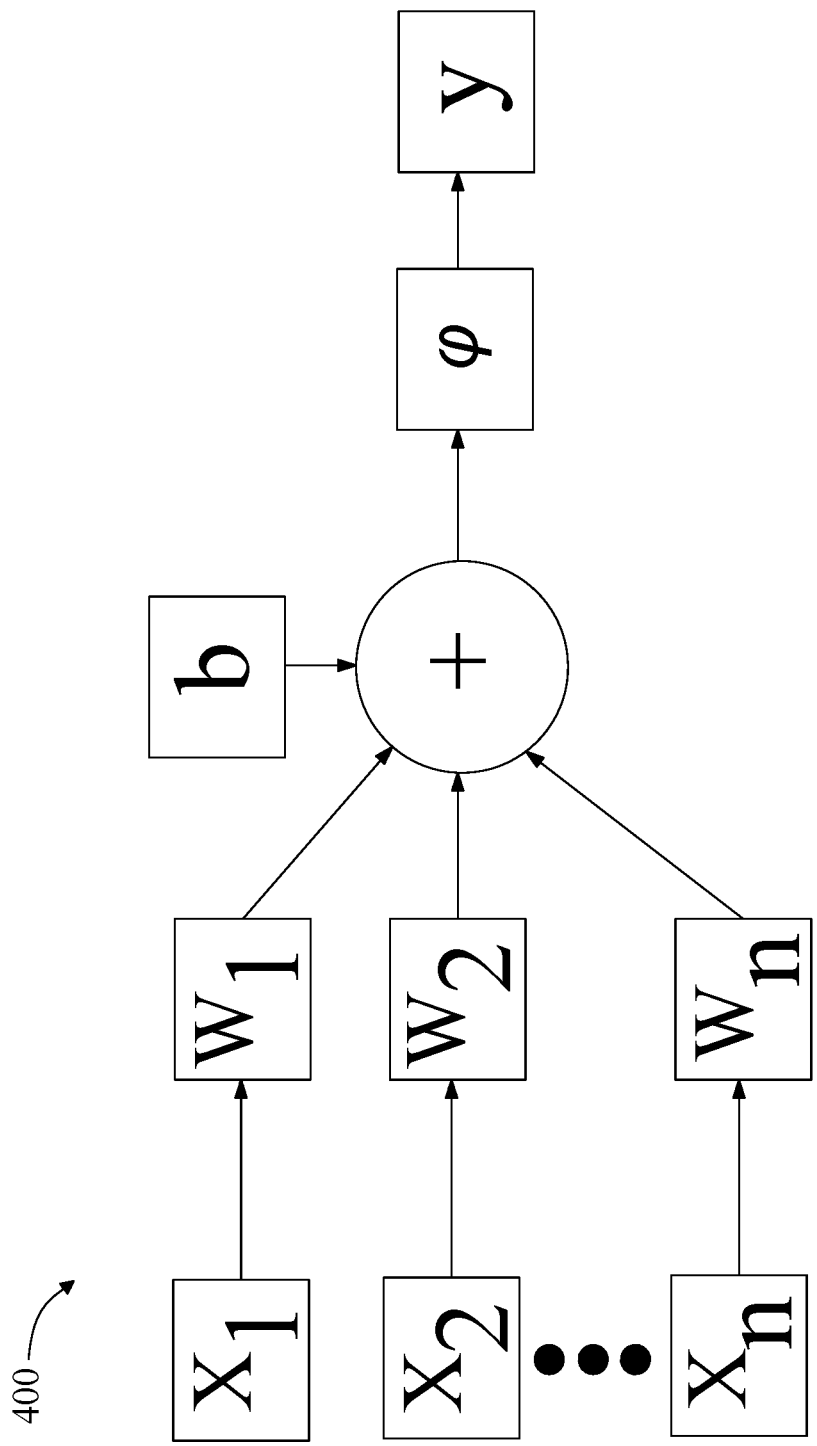
FIG. 4 is a diagram of an exemplary neural network node.

Referring now to FIG. 4, an exemplary embodiment of a node 400 of a neural network is illustrated. A node may include, without limitation a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
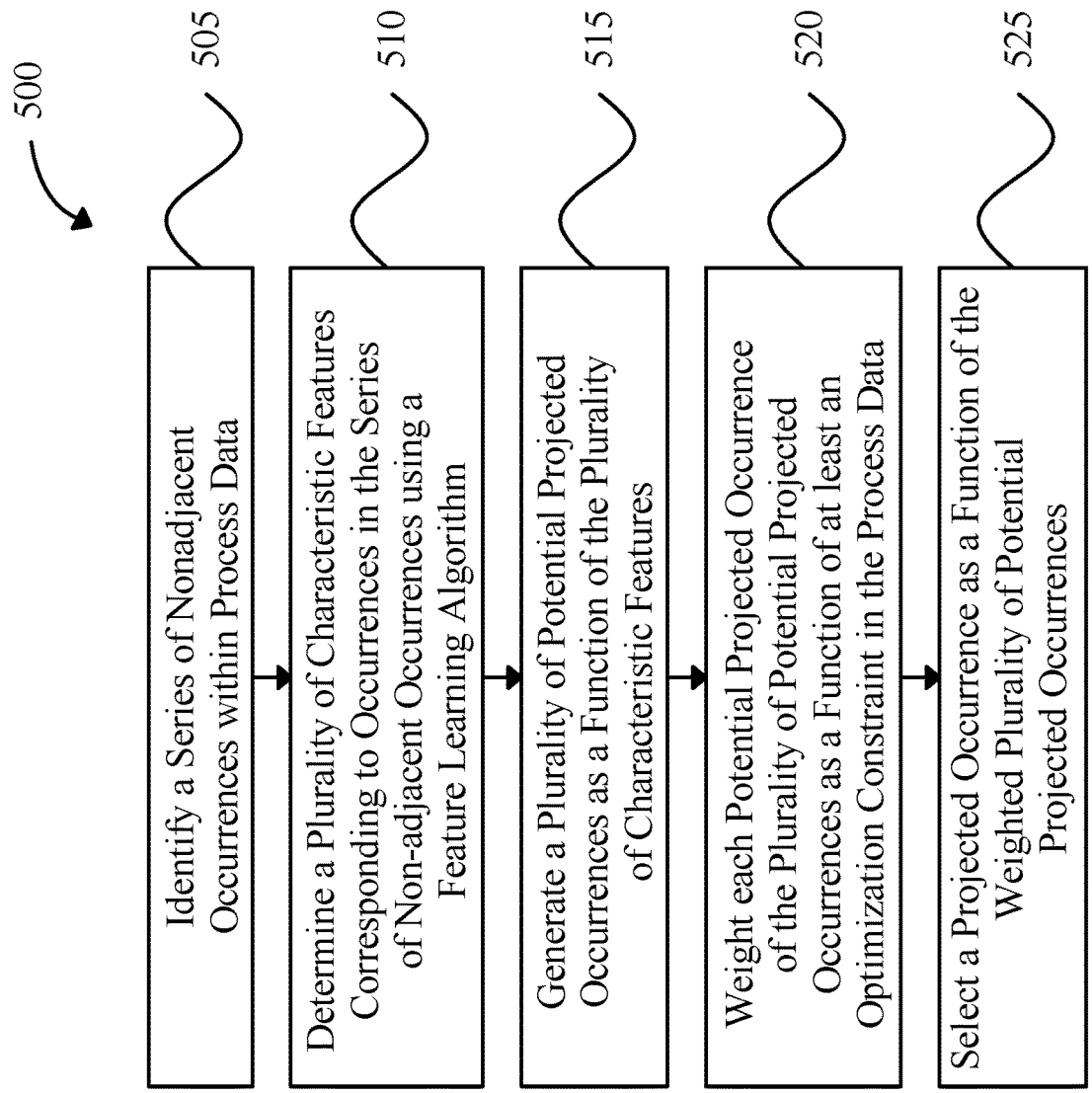
FIG. 5 is a diagram depicting an exemplary method of determining a projected occurrence.

Referring now to FIG. 5, an exemplary embodiment of a method 500 of determining a projected occurrence is illustrated. One or more steps if method 500 may be implemented, without limitation, as described with reference to other figures. One or more steps of method 500 may be implemented, without limitation, using at least a processor.

Still referring to FIG. 5, in some embodiments, method 500 may include identifying a series of nonadjacent occurrences within process data 505.

Still referring to FIG. 5, in some embodiments, method 500 may include determining a plurality of characteristic features corresponding to occurrences in the series of nonadjacent occurrences using a feature learning algorithm 510. In some embodiments, the plurality of characteristic features is determined using K-means clustering.

Still referring to FIG. 5, in some embodiments, method 500 may include generating a plurality of potential projected occurrences as a function of the plurality of characteristic features 515. In some embodiments, generating the plurality of potential projected occurrences includes training a potential projected occurrence machine learning model on a first training dataset including a first plurality of example characteristic features as inputs correlated to a first plurality of example potential projected occurrences as outputs; and generating the plurality of potential projected occurrences as a function of the plurality of characteristic features using the trained potential projected occurrence machine learning model. In some embodiments, generating the plurality of potential projected occurrences includes determining a probability of each potential projected occurrence of the plurality of potential projected occurrences.

Still referring to FIG. 5, in some embodiments, method 500 may include weighting each potential projected occurrence of the plurality of potential projected occurrences as a function of at least an optimization constraint in the process data 520.

Still referring to FIG. 5, in some embodiments, method 500 may include selecting at least one projected occurrence as a function of the weighted plurality of potential projected occurrences 525. In some embodiments, selecting the at least one potential projected occurrence includes determining which potential projected occurrence of the plurality of potential projected occurrences has the highest weighting.

Still referring to FIG. 5, in some embodiments, method 500 may further include generating an unsupervised machine learning model as a function of the feature learning algorithm; and determine the plurality of characteristic features using the unsupervised machine learning model.

Still referring to FIG. 5, in some embodiments, method 500 may further include identifying the series of nonadjacent occurrences as a function of a first occurrence of the series of nonadjacent occurrences and a second occurrence of the series of nonadjacent occurrences; and the first occurrence and the second occurrence include communications utilize different communication channels.

Still referring to FIG. 5, in some embodiments, method 500 may further include obtaining a second training dataset including a second plurality of example characteristic features as inputs correlated to a second plurality of example potential projected occurrences as outputs; and retraining the potential projected occurrence machine learning model using the second training dataset. In some embodiments, method 500 may further include gathering a datum as a function of the projected occurrence prior to the projected occurrence. In some embodiments, method 500 may further include scheduling a calculation as a function of the projected occurrence prior to the projected occurrence.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
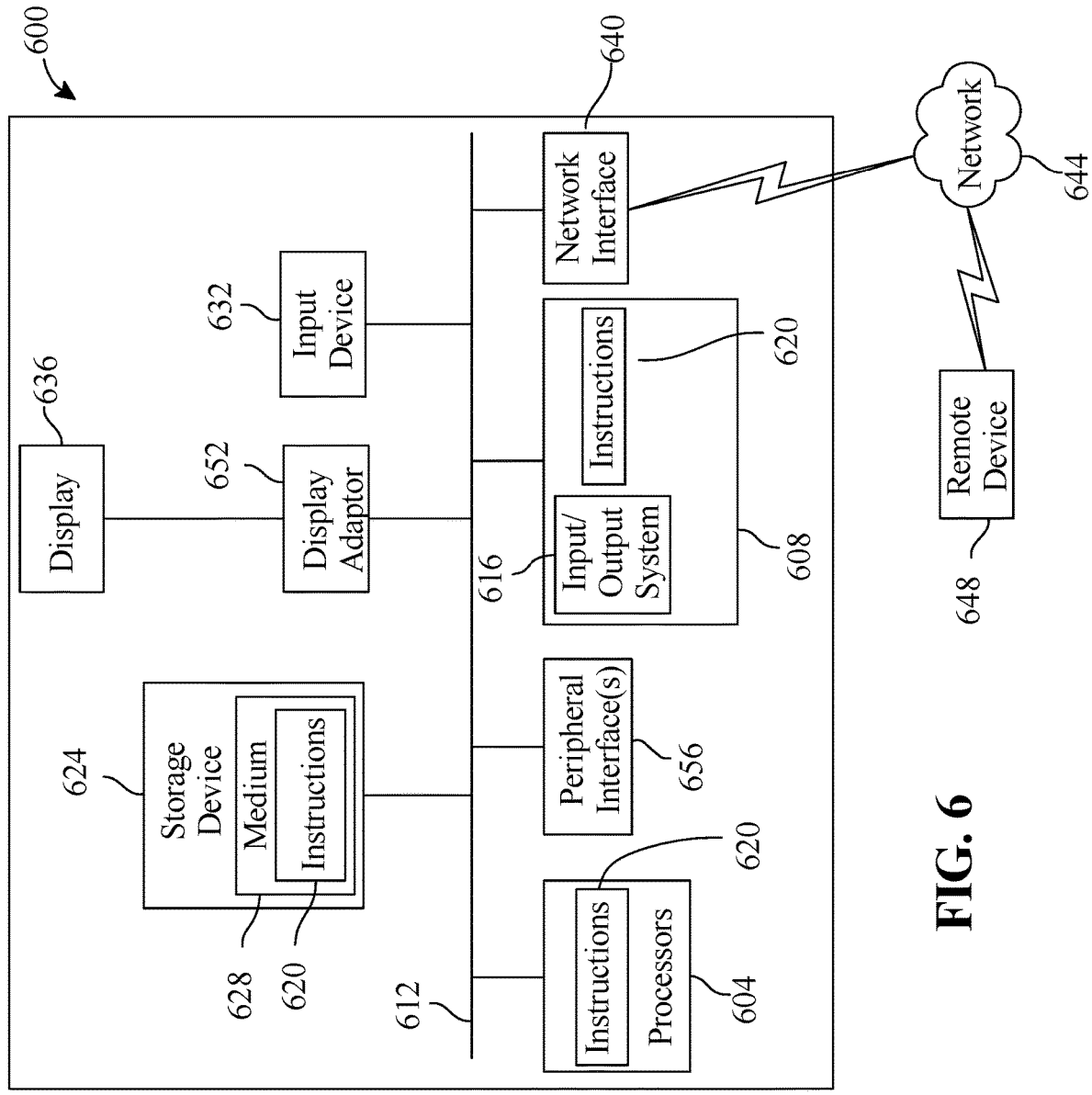
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining a projected occurrence, the apparatus comprising:
- at least a processor; and
- a memory communicatively connected to the at least processor, wherein the memory contains instructions configuring the at least processor to:
  - identify a series of nonadjacent occurrences within process data;
  - determine a plurality of characteristic features corresponding to occurrences in the series of non-adjacent occurrences using a feature learning algorithm;
  - generate a plurality of potential projected occurrences as a function of the plurality of characteristic features by:
    - training a potential projected occurrence machine learning model on a first training dataset including a first plurality of example characteristic features as inputs correlated to a first plurality of example potential projected occurrences as outputs;
    - iteratively performing automated field testing on outputs generated by the trained potential projected occurrence machine learning model;
    - determine an accuracy score of the trained potential projected occurrence machine learning model based on user feedback;
    - retraining the trained potential projected occurrence machine learning model by obtaining a second training dataset including a second plurality of example characteristic features as inputs correlated to a second plurality of example potential projected occurrences as outputs modified according to the user feedback; and
    - generating the plurality of potential projected occurrences as a function of the plurality of characteristic features using the retrained potential projected occurrence machine learning model;
  - weight each potential projected occurrence of the plurality of potential projected occurrences as a function of at least an optimization constraint in the process data;
  - select at least one projected occurrence as a function of the weighted plurality of potential projected occurrences; and
  - allocate a resource as a function of the at least one projected occurrence, wherein allocating the resource comprises at least one of initiating a physical process and transmitting a signal to another device to address the at least one projected occurrence.

2. The apparatus of claim 1, wherein the memory further contains instructions configuring the at least a processor to:
- generate an unsupervised machine learning model as a function of the feature learning algorithm; and
- determine the plurality of characteristic features using the unsupervised machine learning model.

3. The apparatus of claim 1, wherein the memory further contains instructions configuring the at least a processor to determine the plurality of characteristic features using K-means clustering.

4. The apparatus of claim 1, wherein:
- the memory contains instructions configuring the at least a processor to identify the series of nonadjacent occurrences as a function of a first occurrence of the series of nonadjacent occurrences and a second occurrence of the series of nonadjacent occurrences; and
- the first occurrence and the second occurrence include communications utilizing different communication channels.

5. The apparatus of claim 1, wherein the memory contains instructions configuring the at least a processor to gather a datum as a function of the projected occurrence prior to the projected occurrence.

6. The apparatus of claim 1, wherein the memory contains instructions configuring the at least a processor to schedule a calculation as a function of the projected occurrence prior to the projected occurrence.

7. The apparatus of claim 1, wherein generating the plurality of potential projected occurrences comprises determining a probability of each potential projected occurrence of the plurality of potential projected occurrences.

8. The apparatus of claim 1, wherein selecting the at least one potential projected occurrence comprises determining which potential projected occurrence of the plurality of potential projected occurrences has the highest weighting.

9. A method of determining a projected occurrence, the method comprising:
- using at least a processor, identifying a series of nonadjacent occurrences within process data;
- using at least the processor, determining a plurality of characteristic features corresponding to occurrences in the series of non-adjacent occurrences using a feature learning algorithm;
- using at least the processor, generating a plurality of potential projected occurrences as a function of the plurality of characteristic features by:
  - training a potential projected occurrence machine learning model on a first training dataset including a first plurality of example characteristic features as inputs correlated to a first plurality of example potential projected occurrences as outputs;
  - iteratively performing automated field testing on outputs generated by the trained potential projected occurrence machine learning model;
  - determine an accuracy score of the trained potential projected occurrence machine learning model based on user feedback;
  - retraining the trained potential projected occurrence machine learning model by obtaining a second training dataset including a second plurality of example characteristic features as inputs correlated to a second plurality of example potential projected occurrences as outputs modified according to the user feedback; and
  - generating the plurality of potential projected occurrences as a function of the plurality of characteristic features using the retrained potential projected occurrence machine learning model;
- using at least the processor, weighting each potential projected occurrence of the plurality of potential projected occurrences as a function of at least an optimization constraint in the process data; and
- using at least the processor, selecting at least one projected occurrence as a function of the weighted plurality of potential projected occurrences; and
- using at least the processor, allocating a resource as a function of the at least one projected occurrence, wherein allocating the resource comprises at least one of initiating a physical process and transmitting a signal to another device to address the at least one projected occurrence.

10. The method of claim 9, wherein the method further includes:
   using at least the processor, generate an unsupervised machine learning model as a function of the feature learning algorithm; and
   using at least the processor, determine the plurality of characteristic features using the unsupervised machine learning model.

11. The method of claim 9, wherein the plurality of characteristic features is determined using K-means clustering.

12. The method of claim 9, wherein:
   the method further includes identifying the series of nonadjacent occurrences as a function of a first occurrence of the series of nonadjacent occurrences and a second occurrence of the series of nonadjacent occurrences; and
   the first occurrence and the second occurrence include communications utilize different communication channels.

13. The method of claim 9, further comprising gathering a datum as a function of the projected occurrence prior to the projected occurrence.

14. The method of claim 9, further comprising scheduling a calculation as a function of the projected occurrence prior to the projected occurrence.

15. The method of claim 9, wherein generating the plurality of potential projected occurrences comprises determining a probability of each potential projected occurrence of the plurality of potential projected occurrences.

16. The method of claim 9, wherein selecting the at least one potential projected occurrence comprises determining which potential projected occurrence of the plurality of potential projected occurrences has the highest weighting.

* * * * *